(No Model.) 2 Sheets—Sheet 2.
L. H. TITUS.
DEVICE FOR FUMIGATING TREES.
No. 385,389. Patented July 3, 1888.
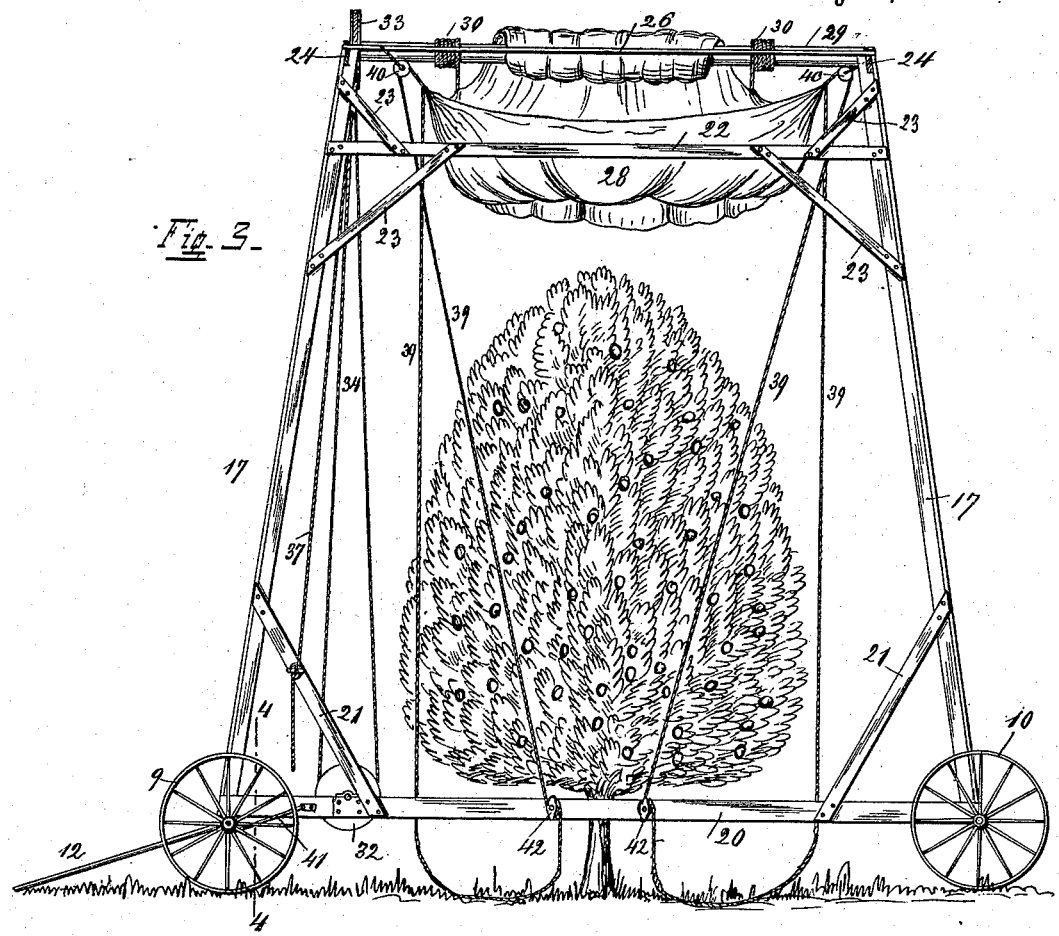

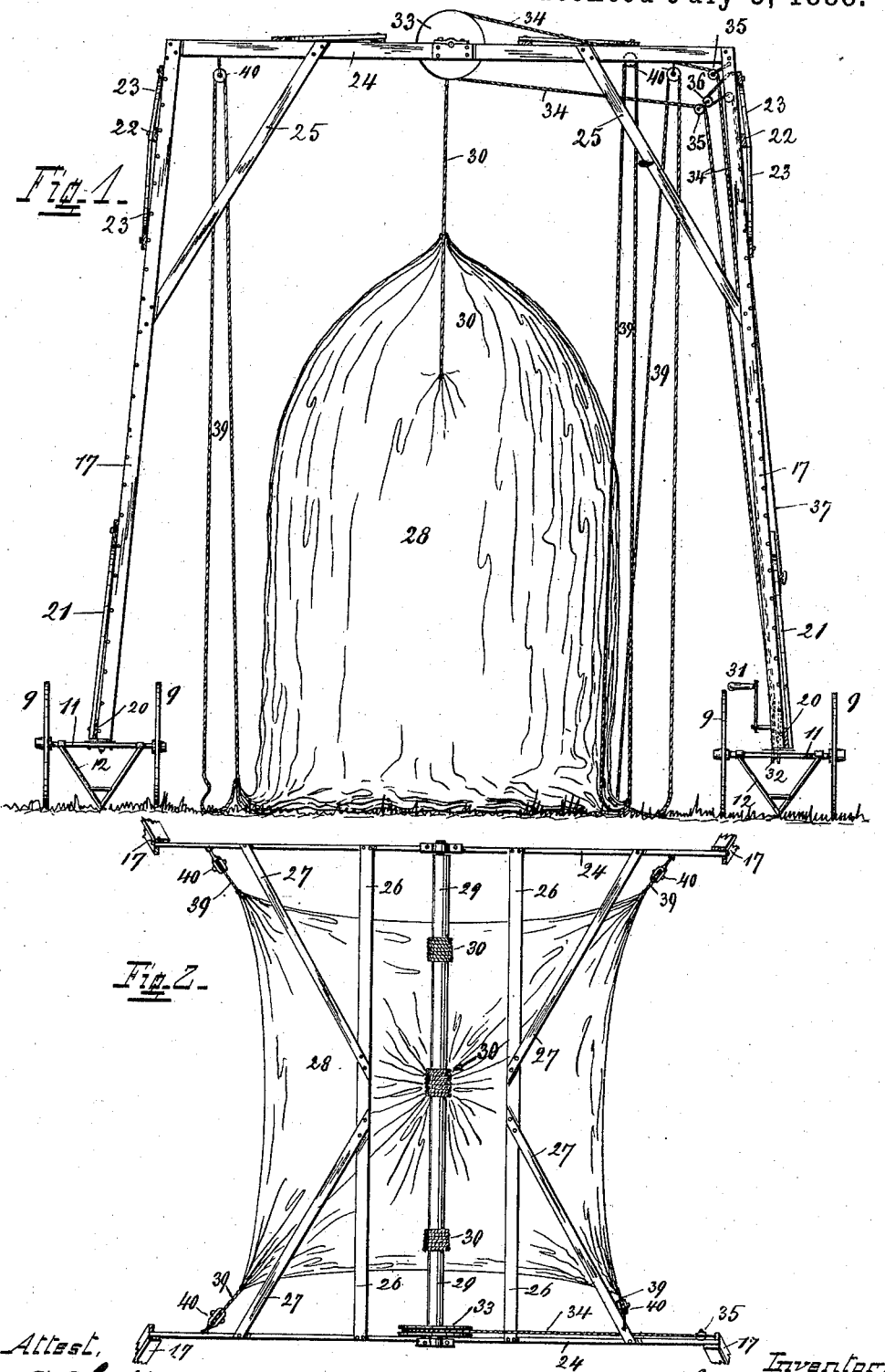

UNITED STATES PATENT OFFICE.

LUTHER H. TITUS, OF SAN GABRIEL, CALIFORNIA.

DEVICE FOR FUMIGATING TREES.

SPECIFICATION forming part of Letters Patent No. 385,389, dated July 3, 1888.

Application filed July 5, 1887. Serial No. 243,454. (No model.)

*To all whom it may concern:*

Be it known that I, LUTHER H. TITUS, a citizen of the United States, residing at San Gabriel, Los Angeles county, State of California, have invented a Device to Fumigate Trees, of which the following is a specification.

My invention relates to an apparatus by which a suspended tent is lowered over a tree down to the ground, so as to shut in the tree completely, in order to prevent escape of the vapors or fumes which are introduced during that position in order to kill destructive insects on the trees. After fumigating a sufficient time, the tent may be raised and removed to the next tree, and so on.

The objects of my invention, which is intended more particularly for the cultivation and protection of orange and lemon trees, are to produce a device which may be easily moved from tree to tree in the orchard by hand and without the aid of draft-animals or other power, and allow the tent to be so managed that it may readily adapt itself to the various heights of the trees, always inclosing them snugly and down to the ground, leaving no spaces, the filling of which would be a waste of vapor. These objects I attain by the construction illustrated in the accompanying drawings, in which—

Figure 1 is a front view showing the tent lowered over a tree, during which time the fumes or vapors are forced in. Fig. 2 is a top view showing the tent hoisted. Fig. 3 is a side elevation showing the tent in the position shown in Fig. 2. Fig. 4 is a section on the line 4 4, Fig. 3, looking forward, and showing connections of axle and king-bolt to the frame. Fig. 5 is a horizontal section on the line 5 5 of Fig. 4. Fig. 6 shows in a top view the crank-pulley, crank, and its connections. Fig. 7 is a rear view of one of the rear axles, showing manner of connection to frame. Fig. 8 is a section on the line 8 8 of Fig. 7.

Similar figures refer to similar parts throughout the several views.

The whole structure rests and moves on wheels or runners, but preferably on six wheels—in front four wheels, two on one axle to each side, while in the rear only one wheel at each corner is required. 9 are the front and 10 the rear wheels, and 11 the front axles. 12 are tongues connected to the front axles to be used in moving. The two front axles swing on king-bolts 13, and are connected by them to the frame, the king-bolt passing through bearings 14 thereon. A small bolster, 15, is interposed between said bearings 14 and axle 11 and bolted to the latter to take off the wear from the axle. 41 is an iron brace reaching from the lower end of the king-bolt, under the axle, to sill 20. The rear axle, 16, as shown most plainly in Figs. 7 and 8, is bolted near its outer end to one of the standards 17, while its inner end is kept in position by two braces, 18 and 19, brace 18 connecting it with standard 17, and brace 19 connecting it with sill 20.

Upright standards 17 are bolted to each end of the sills 20 immediately over the wheels, and are further connected with them by braces 21. The standards are constructed as shown best in Figs. 5 and 8, consisting of two planks bolted together at right angles near the edges— a construction which, while very light, insures great strength and stiffness, and is preferable to solid timbers, gas-pipe, or iron. At and near their upper ends the standards are connected between each other and with the ones of the other side by longitudinal rails 22 and braces 23 and cross-rails 24 and braces 25. Additional longitudinal rails, 26, and braces 27 are provided on top of cross-rails 24, to further strengthen and stiffen the structure.

The tent 28, preferably of oiled bed-ticking or other similar suitable material, is connected to and suspended from a drum, 29, by ropes 30. The length of these ropes is so adjusted that they lift the tent simultaneously at all points of suspension. The drum 29 revolves in bearings on the rails 24, the width of which is increased by blocks at those points. Its construction is immaterial. The points to be considered are little weight with sufficient strength to carry the tent. A tube of galvanized iron has been used very advantageously for this purpose. The tent is raised by a crank, 31, on a grooved pulley, 32, by which motion is transmitted to the drum 29 and its grooved pulley 33 by means of an endless rope, 34, passing through guide-pulleys 35. One of said guide-pulleys 35 is connected to a tightening-pulley, 36, by means of which, in connection with a rope, 37, any slack may be taken out of endless rope 34, thereby always keeping it tight. After the tent has been raised to a desired height, it may be held there by a pin, 38, which, being stuck in the frame-work, keeps the crank from turning. (See Fig. 6.) The tent is lowered principally by its own weight after the pin 38 releases the crank 31. To assist, however, and to hasten the lowering of the tent, and to be enabled to pull it down over far-outreaching branches of the trees, four or more guy-ropes, 39, are provided. These ropes pass through pulleys 40, and their ends are connected by suitable means with each other and with the tent, so that by pulling either one of the two downward-hanging halves of one of said guy-ropes 39 the corresponding corner of the tent may be raised or lowered, as desired. They also serve to keep the lower open portion of the tent stretched apart prior to the lowering, and may be tied in that position, if desired, to suitable pins, 42, as shown in Fig. 3.

I do not confine myself to any particular materials or dimensions. Wire ropes might be used, or chain or leather belting, in place of endless rope 34. Flange and angle iron could be substituted in the construction of the frame, and its combination as is shown now in the present preferred form may be changed in many details without departing from the spirit of the invention.

Having described my invention and the manner of performing the same, what I claim as new, and desire to secure by Letters Patent, is—

1. The combination, with a portable frame adapted to travel between rows of trees, of a vertically-movable tent suspended from the top of the frame and ropes for manipulating the same, whereby the said tent may be adjusted to envelop trees of various sizes, substantially as specified.

2. The combination, with a portable frame adapted to travel between rows of trees, of a rotatable drum journaled in the top thereof and a rope suspending a tent and connected with the drum, substantially as specified.

3. The combination, with a vertical frame adapted to travel between rows of trees, of a horizontal rotatable drum journaled in the top thereof, a vertically-movable tent suspended from the said drum, ropes for raising and lowering the tent, and ropes for manipulating its lower edges, substantially as specified.

4. In a device to fumigate trees, the combination of an upright frame consisting of horizontal sills 20, standards 17, angular braces, top longitudinal rails, top cross-rails, 24, wheels whereon said frame rests and moves, a tent suspended from the upper horizontal portion of the frame, and suitable ropes to raise and lower said tent, as and for the purpose specified.

5. In a device to fumigate trees, the combination of a suitable frame, the uprights of which each rest on an individual truck of wheels or runners, a horizontal drum journaled in the top of said frame, and a tent suspended therefrom.

6. In a device to fumigate trees, the combination of an upright frame resting on trucks, a drum supported in the top of said frame, a tent suspended from the drum, and ropes to raise and lower said frame, so as to suit the height of the tree.

In testimony of which invention I hereunto set my hand.

LUTHER H. TITUS.

Witnesses:
 CARL SPENGEL,
 FRANCIS M. BIDDLE.